United States Patent [19]

Ogino et al.

[11] Patent Number: 4,821,551

[45] Date of Patent: Apr. 18, 1989

[54] METHOD OF MANUFACTURING CORRUGATE TUBE AND MOLDING APPARATUS THEREOF

[75] Inventors: Mineo Ogino, Aichi; Masazumi Ohnishi, Toyota, both of Japan

[73] Assignee: Toyota Jidosha Kabushiki Kaisha, Japan

[21] Appl. No.: 124,961

[22] Filed: Nov. 24, 1987

[30] Foreign Application Priority Data

Nov. 25, 1986 [JP] Japan .............................. 61-180732[U]
Feb. 19, 1987 [JP] Japan .................................. 62-36181
Feb. 19, 1987 [JP] Japan .................................. 62-36183

[51] Int. Cl.⁴ ............................................. B21D 15/06
[52] U.S. Cl. ......................................... 72/302; 72/342
[58] Field of Search .................. 72/59, 302, 342, 367; 219/8.5, 10.43

[56] References Cited

U.S. PATENT DOCUMENTS

| 1,010,931 | 12/1911 | Maciejewski | 72/342 |
| 2,459,971 | 1/1949 | Stanton | 219/10.43 |
| 4,727,641 | 3/1988 | Kanatani et al. | 72/342 |

FOREIGN PATENT DOCUMENTS 144529  8/1984  Japan ..................................... 72/342

*Primary Examiner*—Lowell A. Larson
*Attorney, Agent, or Firm*—Finnegan, Henderson Farabow, Garrett & Dunner

[57] ABSTRACT

There is disclosed a technique characterized by the following steps. An axial load is applied from both ends of a primary tube while locally heating the primary tube by use of a high frequency coil in the peripheral direction, and the heated portion is thereby bulged. The application of load is stopped almost concurrently with termination of the heating process. The heated portion is forcibly cooled with a cooling liquid, thus molding one crest. Then the primary tube and the high frequency coil are relatively moved. The next crest is formed by repeating the foregoing steps. Such operations are consecutively repeated in the axial direction of the primary tube, thereby obtaining a corrugate tube formed with crests having a large amount of bulge and a small pitch.

19 Claims, 6 Drawing Sheets

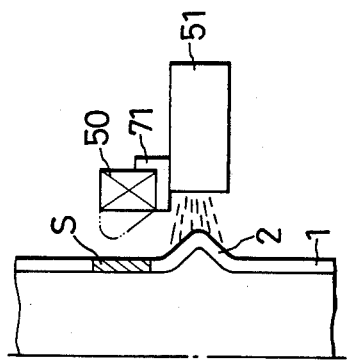
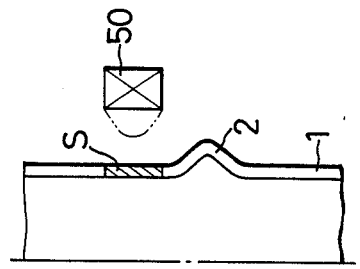
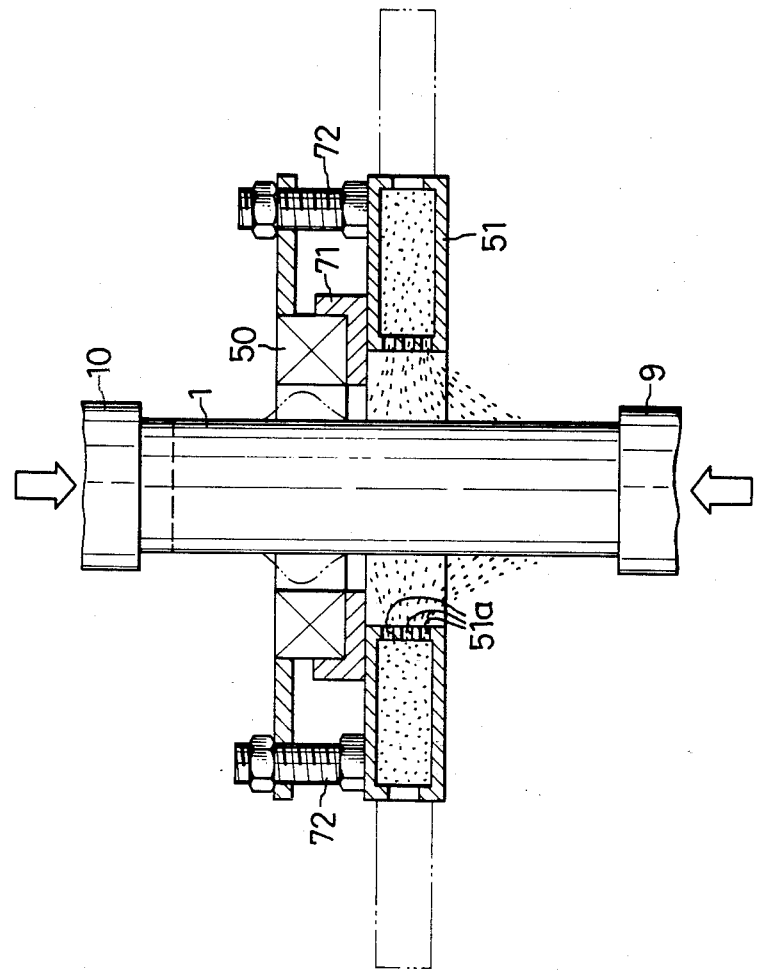

METHOD OF MANUFACTURING CORRUGATE TUBE AND MOLDING APPARATUS THEREOF

BACKGROUND OF THE INVENTION

1. Field of the Invention

The present invention is directed to a method of manufacturing a corrugate tube from a primary tube and to a molding apparatus thereof.

2. Description of the Invention

A conventional method of molding a corrugate tube from the primary tube generally involves a hydraulic bulge processing method. The hydraulic bulge processing method is based on the following steps: the primary tube is inserted into a molding die; a hydraulic pressure is introduced thereinto while forcing down both ends of the primary tube with an embossing die in a liquid-tight state; and the primary tube is bulged to stick to the surface of the molding die. The hydraulic bulge processing method has advantages of obtaining a large amount of bulge and facilitating the molding of materials having deteriorated processing properties.

However, there arise the following problems inherent in the hydraulic bulge processing method because of action of superhigh pressures.

(1) The primary tube has to be liquid-tightly held, and hence both the primary tube and the embossing die are required to be processed with high accuracy.

(2) The molding die and the embossing die have to withstand the superhigh pressures and have their own movable structure, thereby inevitably leading to an increase in size of structure of the die accompanied with intricateness.

(3) A large-sized hydraulic unit is needed, and the apparatus as a whole becomes complicated and oversized in combination with the scaling-up of the die structure. This will bring about an augmentation in costs of apparatus and maintenance.

Recently, there has been developed a technique (Japanese Patent Laid-Open Publication No. 144529/1984) in which after a steel tube has locally been heated in the peripheral direction, the thus heated portion is swollen by applying a compressive load from both ends of the steel tube, and a corrugate tube is manufactured by repeating these processes at a predetermined pitch. This method requires no molding die and contributes to a reduction in cost of constructing the apparatus. In addition, it is possible to obtain a degree of freedom in terms of manufacture wherein the corrugate tube is obtained from a thick primary tube in an arbitrary size.

The above-mentioned novel method of manufacturing the corrugate tube has, however, such problems that the heat emitted from the now-heated portion is transferred to the previously bulge-molded crest (previously-molded-crest), and the previously-molded-crest is apt to be buckled by the thermal action when decreasing the molding pitch, thereby easily coming into an incapable molding state.

The operation of applying the compressive load after undergoing the heating process requires a step of setting a heating time and a compressing time, separately. Moreover, there is a restraint where a formation-shift to the subsequent crest must wait till the previously-molded-crest has been cooled in order to prevent the above-described buckling. An additional defect is that a processing efficiency which will meet the expectation can not be acquired.

SUMMARY OF THE INVENTION

It is a primary object of the present invention to provide a method of manufacturing a corrugate tube with a high efficiency which has a large amount of crest-bulge and a small pitch of crest.

To this end, according to one aspect of the invention, there is provided a molding apparatus capable of molding the corrugate tube without employing a complicated and large-sized die and hydraulic unit as well.

The method of manufacturing the corrugate tube according to the present invention is characterized by such an arrangement that: an axial load is applied from both ends of a primary tube while locally heating the primary tube with a high frequency coil in the peripheral direction to bulge the heated portions; the application of load is stopped almost simultaneously when the heating process is completed; the heated portions is cooled by use of a cooling liquid; and these steps are repeated at a predetermined pitch in the axial direction of the primary tube.

In the method of manufacturing the corrugate tube according to the present invention, a timing at which the axial load is applied is not particularly confined, but it is feasible to apply the load simultaneously when starting the heating process or in the course of the heating process.

In the manufacturing method according to the present invention, the way of cooling the heated portion may be arbitrary and may be varied as follows: the cooling liquid is injected towards the primary tube from outside; the cooling liquid is constantly circulated through the primary tube; and the primary tube is wholly immersed into the cooling liquid during the heating process. Especially when cooling the primary tube during the heating process, the bulge-molded crest is cooled simultaneously when the heating is finished, this yielding advantages of decreasing the time required for the cooling and enhancement of the productivity.

In the manufacturing method according to the present invention, a yoke is added to the high frequency coil, whereby a peak of current distribution of the high frequency coil can be deviated away from the previously-molded-crest. This restrains the thermal influences on the previously-molded-crest and is also convenient for decreasing the molding pitch.

In the manufacturing method according to the present invention, the way of repeating the bulge molding at the predetermined pitch is arbitrary. The following manners can be adopted. The primary tube may fixedly be set and the high frequency coil is moved; or alternatively, the high frequency coil may be fixed and the primary tube is moved.

Based on the above-described method of manufacturing the corrugate tube, the heated portion is forcibly cooled with the cooling liquid, and the thermal influences exerted on the previously-molded-crest can therefore be minimized. As a result, the previously-molded-crest is hard to be buckled even if the molding pitch is reduced.

The axial load is applied in the course of effecting the heating process. Hence, the swollen portion gradually approaches the inner surface of the high frequency coil, with the result that the heating efficiency increases with a passage of time and there is produced a rise in capability of plastic deformation of the primary tube. It is therefore possible to obtain an amount of bulge which sufficiently satisfies the requirements even after the bulge-molding has been finished concurrently with termination of the heating process. In addition, the crests which have undergone the bulge-molding process can immediately be cooled with the cooling liquid, and the molding can continuously be shifted to the subsequent crest. Thus, the processing efficiency is considerably improved.

A molding apparatus for molding a corrugate tube according to the present invention is composed of: a base; a pair of upper and lower frames supported on the base; pressurizing means for applying an axial load to the primary tube while holding the primary tube between the pair of upper and lower frames; a high frequency coil and a cooling coil which are integrally so disposed between the pair of frames as to surround the primary tube; and driving means for moving the pair of frames and any one of the high frequency and cooling coils in the axial direction of the primary tube.

In the molding apparatus according to the present invention, the pressurizing means may include a cylinder or a servomotor which serves as a driving source. Where the cylinder is employed as the driving source, an output of the cylinder is propagated directly to the primary tube. While on the other hand, when adopting the servomotor as the driving source, the motor output is transmitted through a kinetic conversion mechanism to the primary tube.

In the molding apparatus according to the present invention, the cooling coil may be provided separately from the high frequency coil or may be incorporated therein.

In the molding apparatus of this invention, a yoke may be interposed between the high frequency coil and the cooling coil.

In the molding apparatus for molding the corrugate tube which has the above-described construction, when the axial load is applied by the pressurizing means while locally heating the primary tube with the high frequency coil in the peripheral direction thereof, the primary tube is locally bulge deformed. If the cooling liquid is injected from the cooling coil immediately after the heating process has been finished or in the course of the heating process, a configuration of the bulged portion is thereby made invariable. It is therefore possible to mold the corrugate tube formed with the crests having the predetermined pitch by repeating the above-mentioned cyclic processes at a given pitch in the axial direction of the primary tube. Namely, the corrugate tube can be molded without using any special die and hydraulic unit, and a novel processing method which substitutes for the hydraulic bulge processing method can be attained.

BRIEF DESCRIPTION OF THE INVENTION

FIG. 11 is a sectional view of a fifth embodiment of the present invention, illustrating the method of manufacturing the corrugate tube and the principal portion of the molding apparatus thereof according to the present invention;

FIG. 12 is a schematic diagram depicting a molding situation in the fifth embodiment; and FIG. 13 is a schematic diagram depicting the molding situation associated with the conventional method.

DETAILED DESCRIPTION OF THE INVENTION

Embodiments of the present invention will hereinafter be described with reference to the accompanying drawings.

Figure 1:
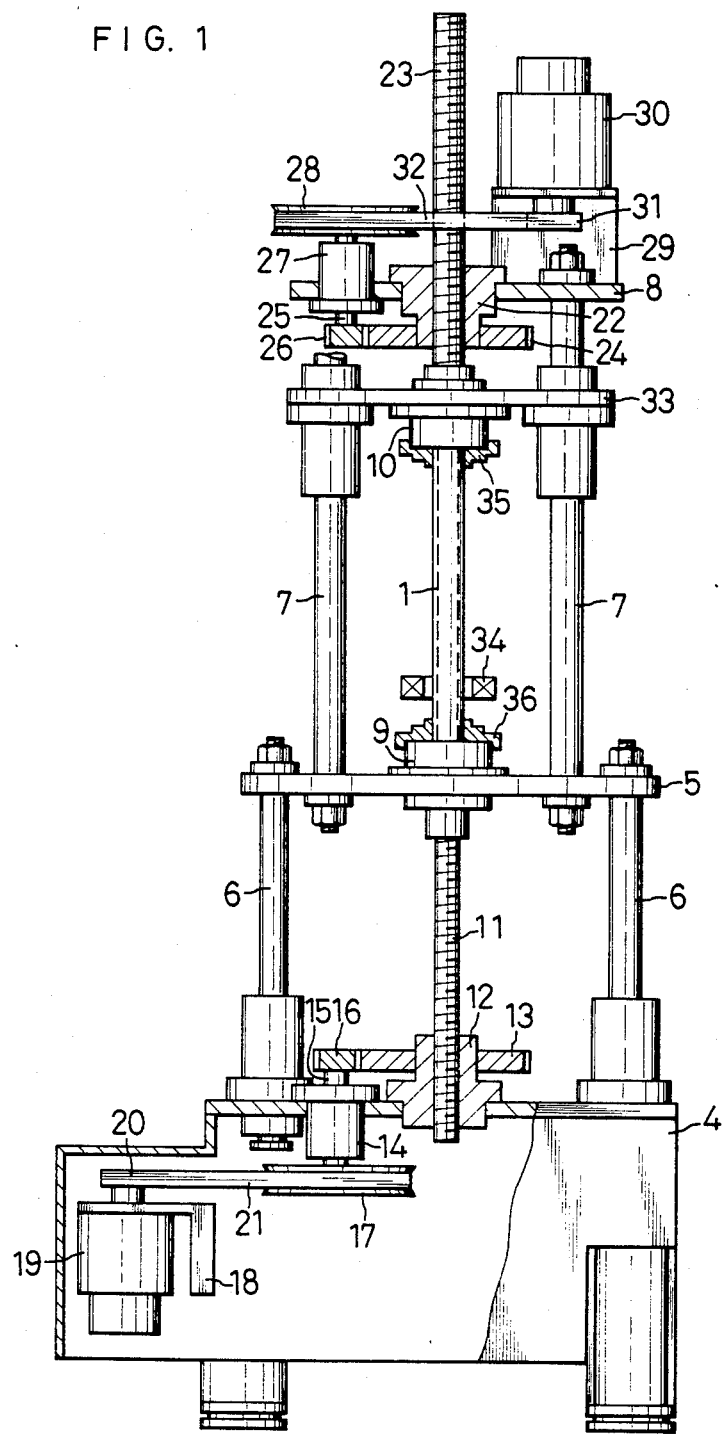
FIG. 1 is a front elevation of a first embodiment of the present invention, illustrating a method of manufacturing a corrugate tube and a molding apparatus thereof according to the present invention.
Figure 2:
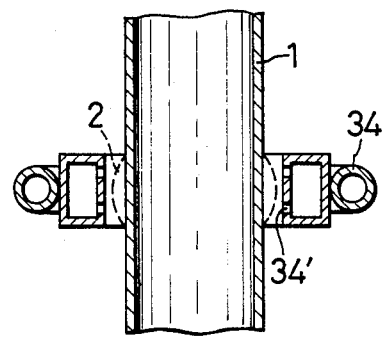
FIG. 2 is an enlarged sectional view of a high frequency coil serving as a part of the molding apparatus.

Turning now attention to FIGS. 1 and 2, there is shown a first embodiment of a method of manufacturing a corrugate tube according to the present invention. In the first embodiment, a lower frame 5 equipped with a pressure receiving plate 9 is supported through a first ball screw 11 on a base 4. A support block 12 for receiving insertion of the first ball screw is rotatably mounted on the base 4. A gear 13 is integrally fitted to the support block 12. A bearing box 14 is fixed to the base 4. A shaft 15 is rotatably supported on the bearing box 14. A gear 16 meshing with the gear 13 is mounted on one end of the shaft 15 which extends above the base 4; and the other end which extends into the base 4 is fitted with a pulley 17. A first servomotor 19 is fixedly provided through a bracket 18 in the base 4. A pulley 20 is secured to an end of the output shaft of the first servomotor 19; and a belt 21 is wound on the pulleys 20 and 17. With this arrangement, the rotation of the first servomotor 19 is transmitted via the belt 21 to the shaft 15 and further transmitted via the pair of gears 13 and 16 to the support block 12. Guide rods 6 each extending downwards are inserted into the base 4, whereby the rotation of the lower frame 5 is restricted. Namely, the support block 12 is rotated by actuating the first servomotor 19. Followed by this rotation, the first ball screw 11, viz., the lower frame 5 is driven to be ascended and descended.

On the other hand, a support block 22 is rotatably mounted on an upper frame 8 connected through connecting rods 7 to the lower frame 5. A second ball screw 23 screws into the support block 22 so as to be supported thereon. A gear 24 is integrally mounted on the support block 22. The gear 24 engages with a gear 26 secured to one end of a shaft 25. The shaft 25 is rotatably supported on a gear box 27 fixed to the upper frame 8; and a pulley 28 is fitted to the other end stretching above the upper frame 8. A second servomotor 30 is fixedly provided through a bracket 29 on the upper frame 8. A pulley 31 is secured to an end of the output shaft of the second servomotor 30 ; and a belt 32 is wound on the pulleys 31 and 28. This arrangement permits the rotation of the second servomotor 30 to be propagated via the belt 32 to the shaft 25 and further propagated via the pair of gears 26 and 24 to the support block 22.

A pressurization moving plate 33 is rotatably retained at the lower end of the second ball screw 23. The turning motion of the pressurization moving plate 33 is restricted by attaching a pressurizing plate 10 to the underside thereof and inserting the connecting rods 7 therethrough. Upon actuation of the second servomotor 30, the support block 22 rotates. Followed by this rotation, the second ball screw, i.e., the pressurization moving plate 33 is driven to be moved up and down.

The reference numeral 34 designates a high frequency coil fixed to the base 4 by unillustrated supporting means. The high frequency coil 34 is defined as a so-called hardening coil. A multiplicity of cooling liquid injection holes 34' are perforated in the inner surface of the high frequency coil 34 (FIG. 2). Chucks 35 and 36 for holding a primary tube 1 are attached to the pressurizing plate 10 and the pressure receiving plate 9.

In this construction, the primary tube 1 is at first held on the pressure receiving plate 9 by utilizing the chuck 36. Subsequent to this step, the second ball screw 23 is rotated by actuating the second servomotor 30, thereby lowering the pressurization moving plate 33 to such an extent that the pressurizing plate 10 impinges upon the upper end of the primary tube 1. At this stage, the second servomotor 30 temporarily ceases to operate, and the primary tube 1 is held by the chuck 35. Next, a high frequency electric power (as one example, an output frequency is 40 KHz, a voltage 5 KV, and an electric current 7.5 A) is impressed on the high frequency coil 34, in which state the second servomotor 30 resumes its operation. The axial load is imparted to the primary tube 1 by use of the pressurizing plate 10 and the pressure receiving plate 9. The heating process and the application of load are combined to cause a crest 2 to be bulge-molded on the primary tube 1 (FIG. 2). The application of electric power to the high frequency coil 34 and the operation of the second servomotor 30 are stopped concurrently with termination of the molding. Immediately after this step, the cooling liquid is injected from the high frequency coil 34.

Then, the first servomotor 19 works to make the first ball screw 11 rotate, thereby descending the lower frame 5 through a predetermined distance (for instance, 10.5 mm). The upper frame 8 is integrally lowered with a descent of the lower frame 5, and the primary tube 1 descends a distance equivalent to the molding area. Subsequently, the above-described operations are repeated, and the corrugate tube having a predetermined number of crests is thereby obtained.

In the first embodiment, the injection of cooling liquid from the high frequency coil 34 is effected soon after the bulge-molding has been completed, so that the molded crest quickly cools off. In consequence, on the occasion of forming the next crest, an increase in temperature of the previously-molded-crest is restrained, and hence the buckling of the previously-molded-crest is hard to take place even when shrinking the molding pitch. Since the compressive load is applied simultaneously when starting the heating process, the bulged portion gradually approaches the inner surface of the high frequency coil 34, resulting in a rise in capability of plastic deformation of the primary tube 1 because of the fact that a heating efficiency increases with a passage of time. It is therefore feasible to obtain an amount of bulge which is sufficiently satisfactory for the requirements even after the compressive load has been imparted, viz., the bulge-molding has been completed almost concurrently with the termination of the heating process. Hence, a time required for molding one crest is reduced as much as possible in cooperation with the foregoing forcible cooling effects. The processing efficiency is also improved.

In the first embodiment, the means for applying the axial load to the primary tube 1 involves the use of the second servomotor 30. Hence, the molding area can be adjusted arbitrarily and precisely. Since the high frequency coil 34 having the function to inject the cooling liquid is employed, the structure can be simplified.

Figure 3:
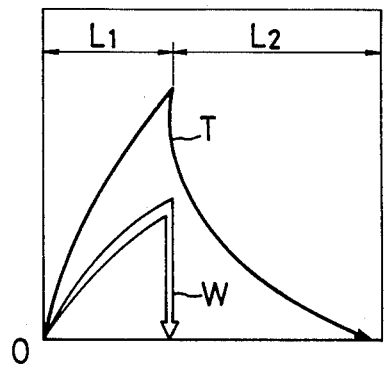
FIG. 3 is a cyclic diagram of heat and load in the first embodiment.

Referring to FIG. 3, there is illustrated cycles of heat and load when molding one crest in the first embodiment. In the Figure, the reference symbol $L_1$ represents a molding range in which both a temperature T and a load W increase. The symbol $L_2$ indicates a cooling range in which the load W comes to 0, while the temperature T exhibits a sharp drop.

The first embodiment will now be explained in a tangible manner.

The working primary tube 1, JIS STKM11A, is 34 mm in outside diameter, 1.0 mm in thickness and 130 mm in length. To start with, the primary tube 1 is heated for 1.8 sec. at a voltage output of 4 KV and an electric current output of 7.5 A by means of the high frequency coil 34 connected to an oscillator having a frequency of 40 KHz and an electric power of 40 KW. This heating process causes the temperature of the bulge-molded portion to reach 800° C. at maximum. On the other hand, soon after the heating has started, the pressurization moving plate 33 is lowered at a descending velocity of 1.6 mm/sec. The pressurization moving plate 33 ceases to descend concurrently with termination of the heating process. Immediately, the cooling liquid is injected from the injection holes 35 of the high frequency coil 34 for 5 sec. with an injection volume of 20 l/min. These operations are repeated at an equal pitch. Subsequently, the above-mentioned operations are repeated with the same number of cycles as that of crests required, thus manufacturing the predetermined corrugate tube. The thus manufactured corrugate tube is subjected to tests for configuration and compression which will be mentioned later. It is to be noted that the same primary tube as the previous one is employed for making a comparison between them. After performing the local heating, the corrugate tube is acquired by the conventional method (the method disclosed in Japanese Patent Laid-Open Publication No. 144529/1984) in which the compressive load is applied, and then undergoes the same tests as above.

Figure 4:
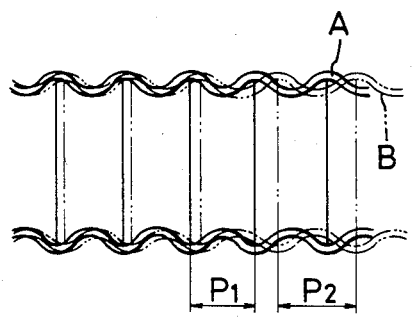
FIG. 4 is a sectional view showing a comparison in configuration between the corrugate tube obtained in the first embodiment and that obtained by a prior art method.

According to the results of the configurational test, as illustrated in FIG. 4, the corrugate tube A obtained by this method exhibits no inferiority in amount of bulge as compared with the corrugate tube B acquired by the conventional method. It can also be confirmed that the molding pitch (the pitch of the corrugate tube A is indicated by $p_1$, and the pitch of the corrugate tube B is $p_2$) obviously becomes small.

Figure 5:
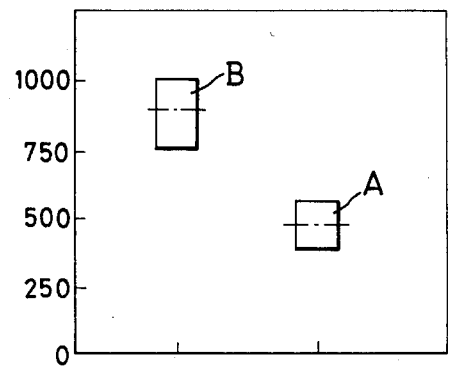
FIG. 5 is a graphic chart illustrating a comparison between experimental results acquired by compressing the corrugate tube in the first embodiment and the results relative to the prior art.

The compressive test shows, as illustrated in FIG. 5, the following results. The corrugate tube A based on this method is deformed by receiving a weight of 300 to 500 kg. In contrast, a weight of 750 to 1000 kg causes the deformation of the corrugate tube B based on the conventional method. It has proved that the corrugate tube obtained by this method has superiority in flexibility to the conventional one.

Figure 6:
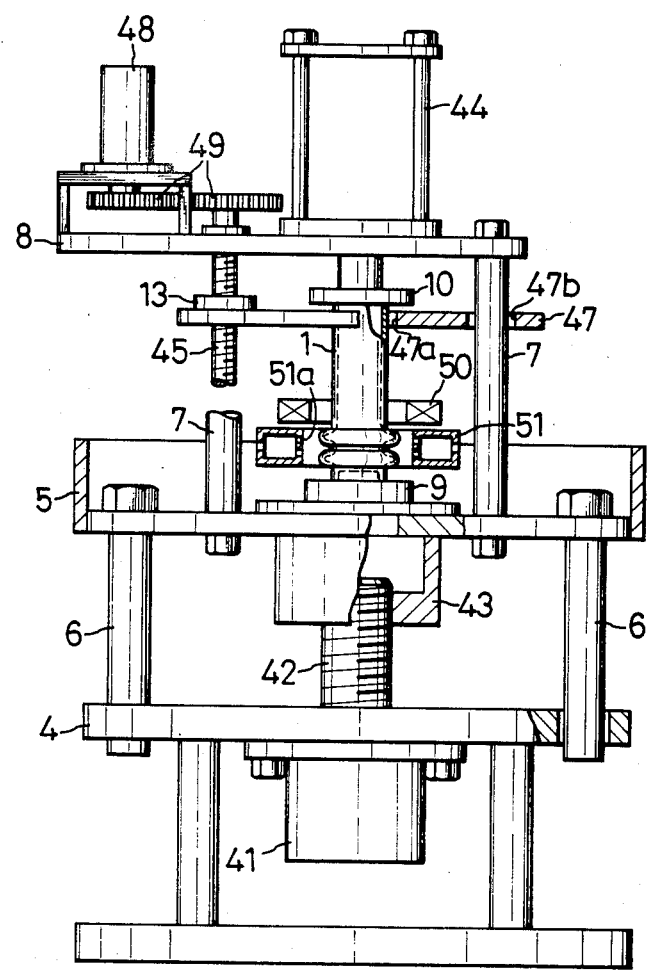
FIG. 6 is a front elevation of a second embodiment of the present invention, illustrating the method of manufacturing the corrugate tube and the molding apparatus thereof according to the present invention.

Directing attention to FIG. 6, there is depicted a second embodiment of the method of manufacturing the corrugate tube according to the present invention. In FIG. 6, the same components as those shown in FIG. 1 are marked with the like symbols, and the description thereof is omitted. In the second embodiment, a ball screw 42 extending from a box 41 including the servomotor and the gears is vertically provided on the base 4. The ball screw 42 is connected through a nut 43 to the lower frame 5. A cylinder 44 is fixed to the upper frame 8. The pressurizing plate 10 is attached to an end of a rod extending downwards from the upper frame 8 mounted with the cylinder 44.

Another ball screw 45 is rotatably interposed between the lower frame 5 and the upper frame 8. A stopper plate 47 integral with a nut 46 is supported through this nut 46 on the ball screw 45. The stopper plate 47 is formed with a hole 47a for admitting insertion of the primary tube 1 and with a hole 47b for admitting insertion of a connecting rod 7 by which the rotation of the stopper plate 47 is restricted. A motor 48 is fixedly mounted on the upper frame 8 and is connected through a gear mechanism 49 to the ball screw 45. Namely, the ball screw 45 is arranged to rotate upon actuating the motor 48. Followed by this rotation, the stopper plate 47 is raised and lowered. The numeral 50 stands for a high frequency coil disposed to encircle the primary tube 1, and the numeral 51 designates a cooling coil disposed just beneath the high frequency coil 50 to similarly encircle the primary tube 1. The two types of coils 50 and 51 are integrally supported on unillustrated supporting means stretching from the base 4. The high frequency coil only performs a function to locally heat the primary tube in the peripheral direction, this high frequency coil 50 being connected to an unillustrated high frequency power source. The cooling coil 51 serves to inject the cooling liquid from an injection hole 51a perforated in the inner peripheral surface thereof in order to locally cool the primary tube 1, this cooling coil being connected to an unillustrated liquid supplying means.

In this construction, the primary tube 1 is at first placed on the pressure receiving plate 9, and subsequently the pressurizing plate 10 is made to impinge upon the upper end of the primary tube 1 by operating the cylinder 44. The operation of the cylinder 44 is temporarily halted. The ball screw 45 is rotated by actuating the motor 48, at which time the stopper plate 47 is arranged to descend a distance equivalent to the molding area from the upper end of the primary tube 1. Next, the cylinder 44 resumes its operation while impressing high frequency power on the high frequency coil 50, and the pressurizing plate 10 and the pressure receiving plate 9 cooperate to apply the axial load to the primary tube 1.

The heated portion of the primary tube 1 is locally swollen by the above-mentioned heating process and the application of load. In the meantime, the pressurizing plate 10 continues to descend and finally butts against the stopper plate 47. At this stage, the operation of the cylinder 44 and the impression of the high frequency electric power on the high frequency coil 50 are stopped. Immediately after this step, the cooling liquid is injected from the cooling coil 51 to cool the bulged portion, thus completing the molding of one crest.

In the second place, upon actuation of the servomotor accommodated in the box 41, the ball screw 42 is turned to descend the lower frame 5 through the predetermined distance. The upper frame 8 linked to the lower frame 5 is likewise lowered with the descent thereof. Consequently, the primary tube 1 also moves downwards in such a way that the primary tube 1 is retained by the pressurizing plate 10 and the pressure receiving plate 9. Then, the stopper plate 47 is lowered once again through a distance equivalent to the molding area by dint of turning motion of the ball screw 45. The subsequent crest is formed by the steps of actuating the cylinder 44, applying the high frequency electric power to the high frequency coil 50 and injecting the cooling liquid from the cooling coil 51. Thereafter, the above-described operations are repeated, thereby obtaining the corrugate tube having the predetermined number of crests as in the case of the first embodiment.

Some variations of the first and second embodiments will now be described with reference to the drawings. In the following Figures, the same components as those depicted in the previous Figures are marked with the like symbols, and the description thereof is omitted.

Figure 7:
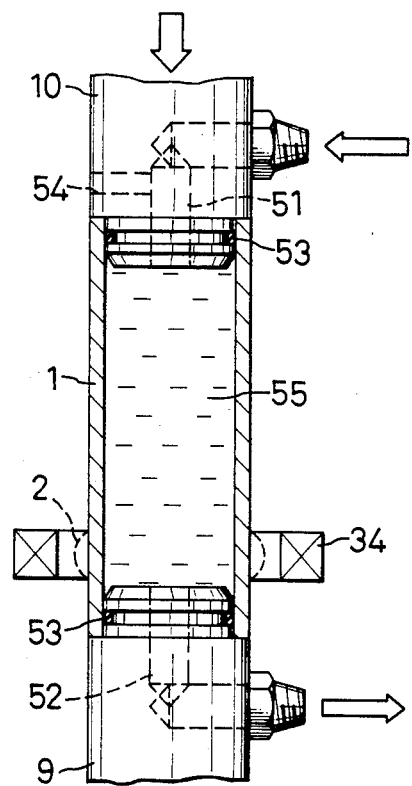
FIG. 7 is a sectional view of a third embodiment of the present invention, illustrating the method of manufacturing the corrugate tube and the principal portion of the molding apparatus thereof according to the present invention.

FIG. 7 illustrates a third embodiment corresponding to a variant form of the first embodiment. The following arrangement is characteristic of the third embodiment. The pressurizing plate 10 and the pressure receiving plate 9 are individually formed with water passing holes 51 and 52. The primary tube 1 is held watertightly through a sealing member 53 between the pressurizing plate 10 and the pressure receiving plate 9. A steam discharge port 54 is formed in the pressurizing plate 10. The steam discharge port 54 communicates via an escape valve with the outside.

In this constitution, a cooling liquid 55 is circulated via the water passing holes 51 and 52 in the primary tube 1, and at the same time the high frequency electric current is applied to the high frequency coil 34, thus initiating the heating process on the primary tube 1. After a predetermined period has passed since the heating process is started, the pressurizing plate 10 is moved downwards to apply the axial compressive load to the primary tube 1. With a further passage of the predetermined period, the impression of the high frequency electric current on the high frequency coil 34 and the descent of the pressurizing plate 10 are simultaneously stopped. A crest 2 which has been bulge-molded on the heated portion of the primary tube 1 rapidly cools off by virtue of the cooling liquid 55 running through the primary tube 1 concurrently with termination of the heating process. As a result, after molding one crest, the high frequency coil 34 is moved, and immediately the next crest can be molded. It is feasible to attain a considerable improvement of the processing efficiency. At the time of effecting the heating process, the pressure within the tube is adjusted by adequately discharging the steam from the steam discharge port 54.

Figure 8:
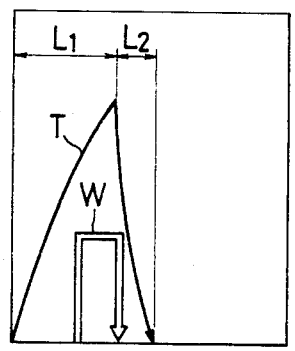
FIG. 8 is a cyclic diagram of heat and load in the third embodiment.

FIG. 8 illustrates cycles of heat and load when molding one crest in the third embodiment. As is obvious from FIG. 8, the cooling range $L_2$ is remarkably narrower than that of the first embodiment (FIG. 3). It can be considered that the cooling effects are invariably present.

The third embodiment will now be described in a tangible manner.

The primary tube to be employed is the same as that of the first embodiment. The primary tube is heated for 1.5 sec. at a voltage output of 9.5 KV and an electric current output of 6.0 A by means of the high frequency coil 34 connected to an oscillator having the same capacity as that of the first embodiment, while circulating the cooling liquid 55 within the primary tube 1. This heating process permits the temperature of the bulge-molded portion to come up to 800° C. at maximum. On the other hand, after 1.0 sec. has passed since the heating process is started, the pressurizing plate 10 is lowered at a descending velocity of 10 mm/sec. The heating stops with a passage of 1.5 sec. from the start of the heating process, and at the same time the pressurizing plate 10 ceases to descend. Then the high frequency coil 34 moves a distance equivalent to the predetermined pitch, and the subsequent crest is molded. These steps are repeated at the equal pitch, thus manufacturing the flexible tube having the predetermined number of crests.

In the third embodiment, the time required for molding one crest amounts to 3.5 sec. including a heating time of 1.5 sec. and a moving time of 2.0 sec. (inclusive of the cooling). Hence, the molding process can be completed within an extremely short period of time. For instance, where the similar molding is performed by the method disclosed in Japanese Patent Laid-Open Publication No. 144529/1984, the time necessary for molding one crest is totally 13.5 sec. including a heating time of 1.5 sec., a cooling time of 10 sec. and a moving time of 2.0 sec.. It can apparently be recognized that the time of molding by the method according to the present invention is remarkably short (approximately 1/5).

In the case of obtaining the least pitch at which the molding can be effected without causing the buckling, the corrugate tube acquired in the third embodiment indicates a pitch of 9.5 mm, while the tube obtained by the conventional method indicates 10.5 mm. Hence, it can be confirmed that the corrugate tube associated with the present invention is superior to that of the prior art.

Figure 9:
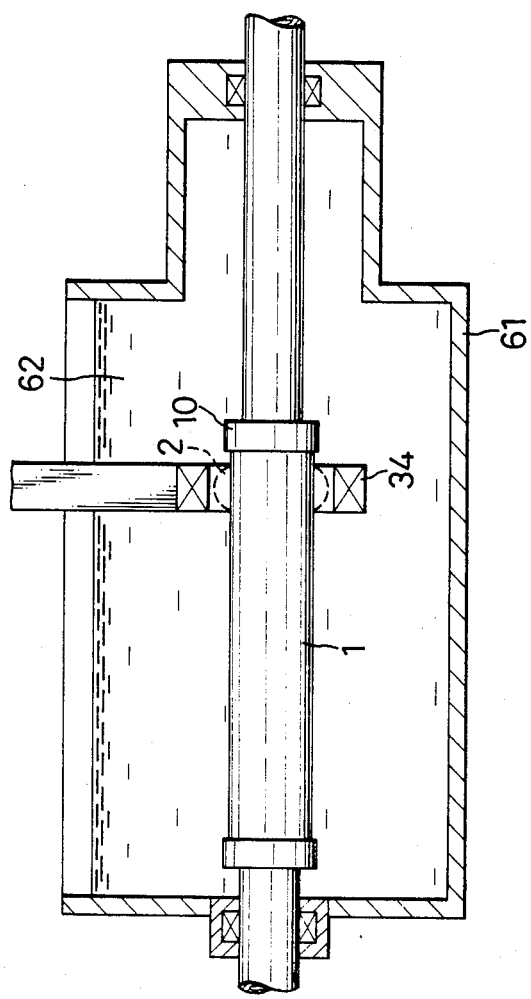
FIG. 9 is a sectional view of a fourth embodiment of the present invention, illustrating the method of manufacturing the corrugate tube and the principal portion of the molding apparatus thereof according to the present invention.

Referring to FIG. 9, there is illustrated a fourth embodiment of the method of manufacturing the corrugate tube according to the present invention. The fourth embodiment is characterized by such an arrangement that the pressurizing plate 10 and the pressure receiving plate 9 are disposed in the horizontal direction, a liquid tank 61 accommodates the primary tube 1 and the high frequency coil 34 as well, and the primary tube 1 is bulge-molded in a cooling liquid 62.

In such a constitution, the primary tube 1 begins to be heated by applying the high frequency electric current to the high frequency coil 34. After the predetermined time has passed since the heating process is started, the pressurizing plate 10 is moved to the left in order that the primary tube 1 undergoes application of the axial compressive load. After the predetermined time has further passed, the impression of the high frequency electric current on the high frequency coil 34 and the movement of the pressurizing plate 10 are simultaneously stopped. The crest 2 which has been bulge-molded on the heated portion of the primary tube 1 quickly cools off simultaneously when stopping the heating process by virtue of the cooling liquid 62 existing in the liquid tank 61. Consequently, after molding one crest, the high frequency coil 34 is moved. Immediately, the next crest can be molded, and it is possible to considerably improve the processing efficiency.

Figure 10:
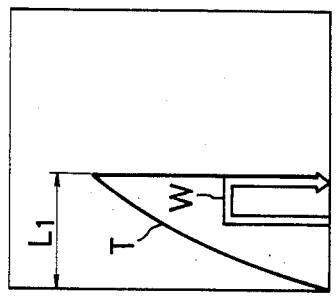
FIG. 10 is a cyclic diagram of heat and load in the fourth embodiment.

FIG. 10 illustrates cycles of heat and load when molding one crest in the fourth embodiment. As is apparent from the Figure, the cooling range $L_2$ corresponding to the ranges in the first and third embodiments virtually comes to 0. Therefore, the processing efficiency can further be improved.

The fourth embodiment will concretely be explained. The primary tube for use is the same as that of the first embodiment. The primary tube is heated for 1.5 sec. at a voltage output of 10 KV and an electric current output of 6.5 A by use of the high frequency coil 34 connected to the oscillator having the same capacity as that of the oscillator employed in the first embodiment. The temperature of the bulge-molded portion comes up to 800° C. at maximum because of the heating process. After 1.0 sec. has passed since the heating is started, the pressurizing plate 10 is operated at a moving velocity of 10 mm/sec.. After 1.5 sec. has passed since the heating is started, the heating process is then stopped. Simultaneously, the pressurizing plate 10 ceases to operate. In the wake of this step, the high frequency coil 34 moves a distance equivalent to the predetermined pitch, and the next crest is molded. Such operations are repeated at the equal pitch, thus manufacturing the corrugate tube having the given number of crests.

In the concretely described fourth embodiment, the time required for molding one crest substantially excludes the cooling time. Hence, as a matter of course, the molding time is even shorter than that of the third embodiment.

Turning attention to FIG. 11, there is depicted a fifth embodiment corresponding to a variant form of the second embodiment. A feature of the fifth embodiment is the arrangement wherein a yoke 71 made from a magnetic material is interposed between the high frequency coil 50 and the cooling coil 51. In FIG. 11, the numeral 72 denotes a bolt by which the high frequency coil 50 and the cooling coil 51 are connected to each other.

In such a constitution, the primary tube 1 is heated by the high frequency coil 50 while injecting the cooling liquid from the cooling coil 51 towards the primary tube 1. The pressurizing plate 10 is shifted in the course of this heating operation, and the primary tube 1 is pressurized in the axial direction, whereby the heated portion is swollen. When performing the heating by use of the high frequency coil 50, the peak of current distribution of the high frequency coil 50, as depicted with a dotted line in FIG. 12, moves in the direction opposite to a yoke 71 because of presence of the yoke 71 made from the magnetic material. In consequence, similarly a heated portion S of the primary tube 1 which is heated by the high frequency coil 50 moves slightly in the direction opposite to the yoke. It follows that an amount of transfer of heat to the previously-molded-crest 2 is reduced. The cooling liquid injected from the cooling coil 51 serves to restrain a rise in temperature of the previously-molded-crest 2. Hence, even if the molding pitch is smaller than that of the conventional example, the buckling of the previously-molded-crest 2 is hard to take place. This phenomenon will become more apparent from a comparison with FIG. 13 illustrating the conventional method (Japanese Patent Laid-Open Publication No. 144529/1984). Namely, the conventional method, as shown by the dotted line, exhibits a normal current distribution in connection with the high frequency coil 50. Therefore, the heated portion S of the primary tube 1 approaches the previously-molded-crest 2, and the heat transfer with respect to the previously-molded-crest 2 becomes large. Furthermore, since there is no special cooling means in this case, it is difficult to quickly cool the crest 2 and to diminish the molding pitch.

The concrete description of the embodiment of the manufacturing method according to the present invention will now be given.

The primary tube for use is the same as that of the first embodiment. To begin with, the cooling liquid is injected from the cooling coil 51 with a volume of 15 l/min.. Subsequently, the primary tube 1 is heated for 1.5 sec. at a voltage output of 5 KV and a current output of 7.5 A by means of the high frequency coil 50 connected to an oscillator having a frequency of 40 KHz and an electric power of 40 KW. Owing to this heating process, the peak of temperature of the bulge-molded portion reaches 1000° C. After 1.0 sec. has passed since the heating is started, the pressurizing plate 10 moves downwards at a descending velocity of 10 mm/sec., and the descent of the pressurizing plate 10 is then halted concurrently with termination of the heating process. Immediately after this, the high frequency coil 50 and the cooling coil 51 are so raised that the previously-molded-crest is moved into the cooling liquid injected from the cooling coil 51. The time required for this movement is 1 sec.. Attainment of the predetermined corrugate tube involves the same number of repetitions of the above-described operations as that of crests required.

In the foregoing embodiment, the time necessary for molding one crest amounts to 2.5 sec. including a heating time of 1.5 sec. and a moving time of 1 sec.. The molding can be finished within an extremely short period of time.

When obtaining the least molding pitch at which the molding can be effected without causing any buckling, a pitch of 9.0 mm is shown for the corrugate tube acquired in the fifth embodiment, while the corrugate tube based on the conventional method indicates 10.5 mm. This proves that the manufacturing method according to the present invention is superior to the conventional method.

What is claimed is:

1. A method of manufacturing a corrugate tube, comprising the steps of:
   (a) locally heating a primary tube by use of a high frequency coil in the peripheral direction;
   (b) applying an axial load from both ends of said primary tube to bulge a heated portion;
   (c) stopping application of said load almost concurrently with termination of the heating step;
   (d) cooling said bulged heated portion with the cooling liquid; and
   (e) repeating steps (a)–(d) at a predetermined pitch in the axial direction of said primary tube.

2. A method of manufacturing a corrugate tube as set forth in claim 1, wherein said axial load is applied simultaneously with the starting of said heating step.

3. A method of manufacturing a corrugate tube as set forth in claim 1, wherein said axial load is applied in the course of said heating step.

4. A method of manufacturing a corrugate tube as set forth in claim 1, wherein said heated portion is cooled by injecting said cooling liquid in the direction towards said primary tube.

5. A method of manufacturing a corrugate tube as set forth in claim 1 or 4, wherein said cooling liquid is injected immediately after said heating step.

6. A method of manufacturing a corrugate tube as set forth in claim 1 or 4, wherein said cooling liquid continues to be injected during said heating step.

7. A method of manufacturing a corrugate tube as set forth in claim 1, wherein said cooling liquid is constantly circulated through said primary tube.

8. A method of manufacturing a corrugate tube as set forth in claim 1, wherein said primary tube is heated in said cooling liquid.

9. A method of manufacturing a corrugate tube as set forth in claim 1, wherein a peak of current distribution of said high frequency coil is made to deviate away from a previously-molded-crest by employing a yoke.

10. An apparatus for molding a corrugate tube, comprising:
    a base;
    a pair of upper and lower frames supported on said base;
    a primary tube held between said pair of frames;
    a high frequency coil encircling said primary tube between said pair of frames operative when activated for locally heating said primary tube in the peripheral direction;
    pressurizing means operative to apply an axial load to said primary tube substantially concurrently with the termination of the activation of the high frequency coil while holding said primary tube between said pair of frames;
    a cooling coil disposed to encircle said primary tube between said pair of frames; and
    driving means for moving said pair of frames and one of said high frequency coil and said cooling coil in the axial direction of said primary tube.

11. An apparatus for molding a corrugate tube as set forth in claim 10, wherein said pressurizing means includes a servomotor used as a driving source.

12. An apparatus for molding a corrugate tube as set forth in claim 10, wherein said pressurizing means includes a cylinder used as a driving source.

13. An apparatus for molding a corrugate tube as set forth in claim 10, wherein said high frequency coil incorporates said cooling coil.

14. An apparatus for molding a corrugate tube as set forth in claim 10, wherein a yoke is provided between said high frequency coil and said cooling coil.

15. An apparatus for molding a corrugate tube as set forth in claim 14, wherein the cooling coil, the yoke and the high frequency coil are arranged longitudinally in series.

16. A method of manufacturing a corrugate tube, comprising the steps of
    (a) locally heating a primary tube by use of a high frequency coil in the peripheral direction;
    (b) applying an axial load from both ends of the primary tube to bulge a heated portion;
    (c) stopping application of the load substantially concurrently with the termination of the heating step;
    (d) injecting a cooling liquid through the high frequency coil for cooling the bulged heated portion; and
    (e) repeating steps (a)–(d) at a predetermined pitch in the axial direction of the primary tube.

17. A method of manufacturing a corrugate tube as set forth in claim 16, wherein the step of injection includes forcing the cooling liquid through perforations formed in the inner circumferential surface of the high frequency coil.

18. An apparatus for molding a corrugate tube, comprising:
a base;
a pair of upper and lower frames supported on said base;
a primary tube held between said pair of frames;
a high frequency coil encircling said primary tube between said pair of frames operative when activated for locally heating said primary tube in the peripheral direction, a cooling liquid being injected through said high frequency coil;
pressurizing means operative to apply an axial load to said primary tube substantially concurrently with the termination of the activation of the high frequency coil while holding said primary tube between said pair of frames; and
driving means for moving said pair of frames and one of said high frequency coil and said cooling coil in the axial direction of said primary tube.

19. An apparatus for molding a corrugate tube as set forth in claim 18, wherein said high frequency coil includes perforations formed on the inner circumferential surface thereof for injecting said cooling liquid.

* * * * *